United States Patent [19]
Pallakoff et al.

[11] Patent Number: 5,689,617
[45] Date of Patent: Nov. 18, 1997

[54] SPEECH RECOGNITION SYSTEM WHICH RETURNS RECOGNITION RESULTS AS A RECONSTRUCTED LANGUAGE MODEL WITH ATTACHED DATA VALUES

[75] Inventors: Matthew G. Pallakoff, Mountain View; Kurt W. Rodarmer, Sunnyvale; Arthur Arlo Reeves, Santa Cruz, all of Calif.

[73] Assignee: Apple Computer, Inc., Cupertino, Calif.

[21] Appl. No.: 404,472

[22] Filed: Mar. 14, 1995

[51] Int. Cl.$^6$ .................................................. G10L 9/00
[52] U.S. Cl. .................................. 395/2.64; 395/2.52
[58] Field of Search ............................ 395/2.52–2.65, 395/2.66

[56] References Cited

U.S. PATENT DOCUMENTS

| | | | |
|---|---|---|---|
| 5,317,673 | 5/1994 | Cohen et al. | 395/2.41 |
| 5,384,892 | 1/1995 | Strong | 395/2.52 |
| 5,390,279 | 2/1995 | Strong | 395/2.52 |
| 5,450,524 | 9/1995 | Rissanen | 395/2.52 |

OTHER PUBLICATIONS

Apple Plain Talk Software Kit User's Guide, Apple Computer, Inc. Copyright 1994.
Speech Recognition API Programmer's Reference, Windows 3.1 Edition rev. .05beta, Sep. 30, 1994.
Speech API SDK, Microsoft Speeach API, Version 1.0, Windows (TM) 95, Microsoft Corporation.

*Primary Examiner*—Fan Tsang
*Attorney, Agent, or Firm*—Mark A. Aaker

[57] ABSTRACT

A speech recognition system operating on a computer system, where the speech recognition system uses a language model with embedded structure and attached data values, and the speech recognition system returns recognition results as a reconstructed language model with embedded structure and attached data values. An application program can receive and traverse the embedded structure of the recognition results and use the attached data values to improve the speed and accuracy of interpretation of the speech recognition results.

9 Claims, 2 Drawing Sheets

5,689,617

SPEECH RECOGNITION SYSTEM WHICH RETURNS RECOGNITION RESULTS AS A RECONSTRUCTED LANGUAGE MODEL WITH ATTACHED DATA VALUES

FIELD OF THE INVENTION

This invention relates to a speech recognition system operating on a computer system.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Researchers have attempted to increase the utility of computer systems by having them recognize speech. To be acceptable to a computer user, the speech recognition system must rapidly and accurately recognize a wide range of words and phrases.

In general, in current speech recognition systems, as the vocabulary which can be recognized increases, the speed and accuracy are reduced, since the speech recognition system must search through more possibilities, and the number of similar-sounding words and phrases increases. These problems have limited the speed and accuracy of speech recognition systems.

One approach to rapid and accurate speech recognition has been to limit the number of words and phrases that can be recognized at a particular time. A limited set of words and phrases which can be recognized at a particular time is called a language model. In its simplest form, a language model is simply a list of words which can be recognized.

The language model can be revised or changed as the computer user interacts with the computer, so that at each point in the use of the computer the active language model contains the words and phrases most likely to be used at that point. Usually, the active language model will contain words and phrases appropriate for the current state of the application program, words and phrases for the operating system, and words and phrases of general applicability such as numbers and words relating to dates and times. Since the language model is usually smaller than a list of all possible words and phrases from all possible times of using the computer, the language model can be searched faster, and speech recognition can be more accurate, since inappropriate match possibilities are excluded. An example of a system using a language model and changing the language model as interaction with the computer proceeds is U.S. Pat. No. 5,384,892 "Dynamic Language Model For Speech Recognition" by inventor Robert D. Strong and assigned to Apple Computer, Inc. However, even with a dynamic language model, additional speed and accuracy is desired.

SUMMARY OF THE INVENTION

This invention relates to a speech recognition system operating on a computer system, where the speech recognition system uses a language model with embedded structure and attached data values, and the speech recognition system returns recognition results as a reconstructed language model with embedded structure and attached data values. An application program can receive and traverse the embedded structure of the recognition results and use the attached data values to improve the speed and accuracy of interpretation of the speech recognition results. These and other features and advantages of the invention will be apparent to a person skilled in the art from the following drawings, description and claims.

DETAILED DESCRIPTION

Figure 1:
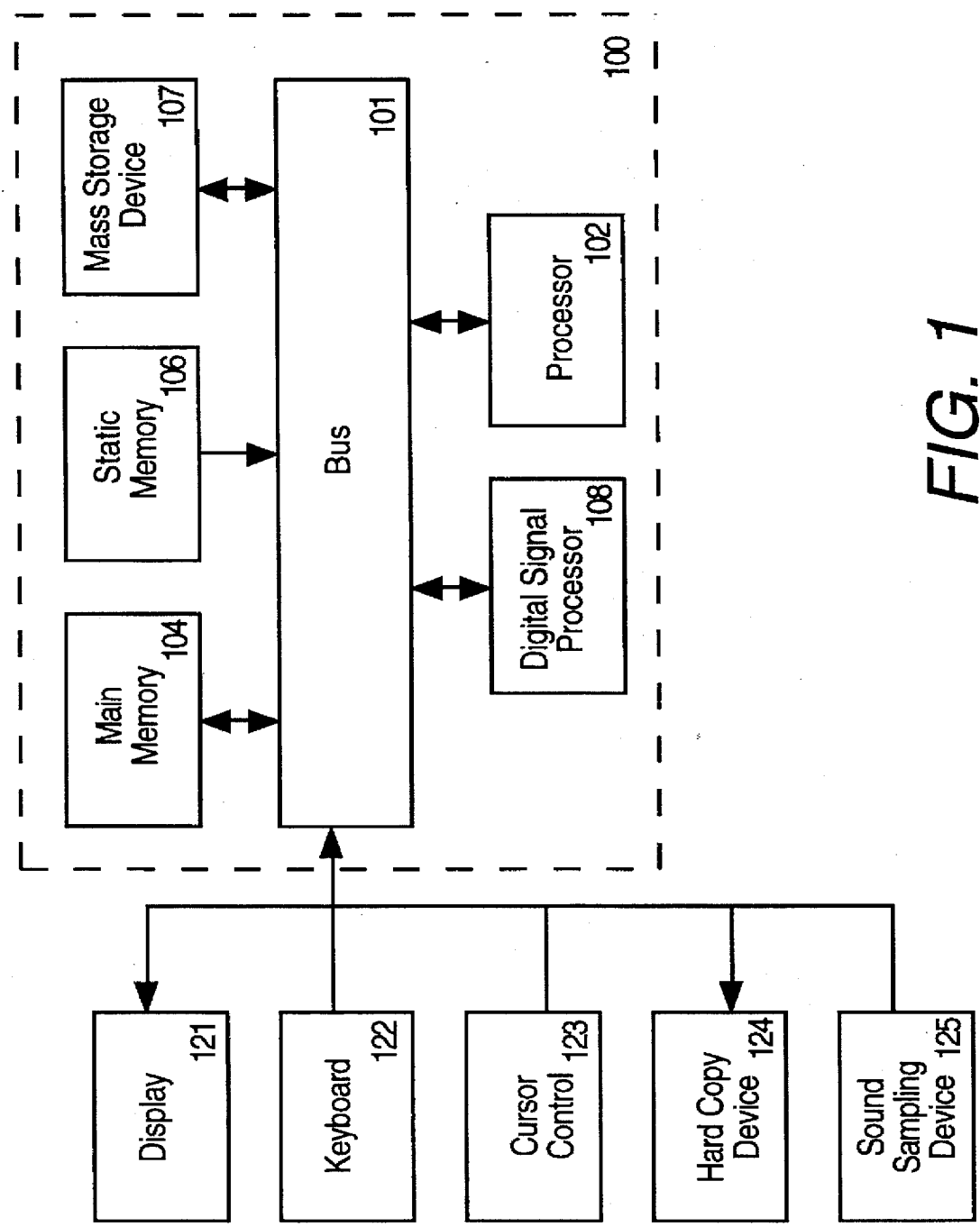
FIG. 1 shows a block diagram of a computer system equipped for speech recognition, upon which the present invention can be implemented.

FIG. 1 shows a block diagram of a computer system equipped for speech recognition, upon which the present invention can be implemented. The computer system is composed of a computer 100 having a communication bus 101 which connects a processor 102 with memory and storage devices. A main memory 104, such as RAM, and a static memory 106, such as ROM, can be used to hold data needed to operate the computer. A mass storage device 107, such as a hard disk, provides a large volume storage area for long term storage of data. When equipped for speech recognition, the computer 100 may also include specialized components such as a digital signal processor 108, which can rapidly process audio and speech signals. With sufficient processing power in processor 102, a digital signal processor 108 may be unnecessary. The computer 100 will also be connected to various external or peripheral devices such as a display 121, keyboard 122, cursor control 123 such as a mouse, and hard copy device 124 such as a printer. When equipped for speech recognition, the computer 100 can be connected to a sound sampling device 125 such as a microphone or other audio input/output interface.

Figure 2:
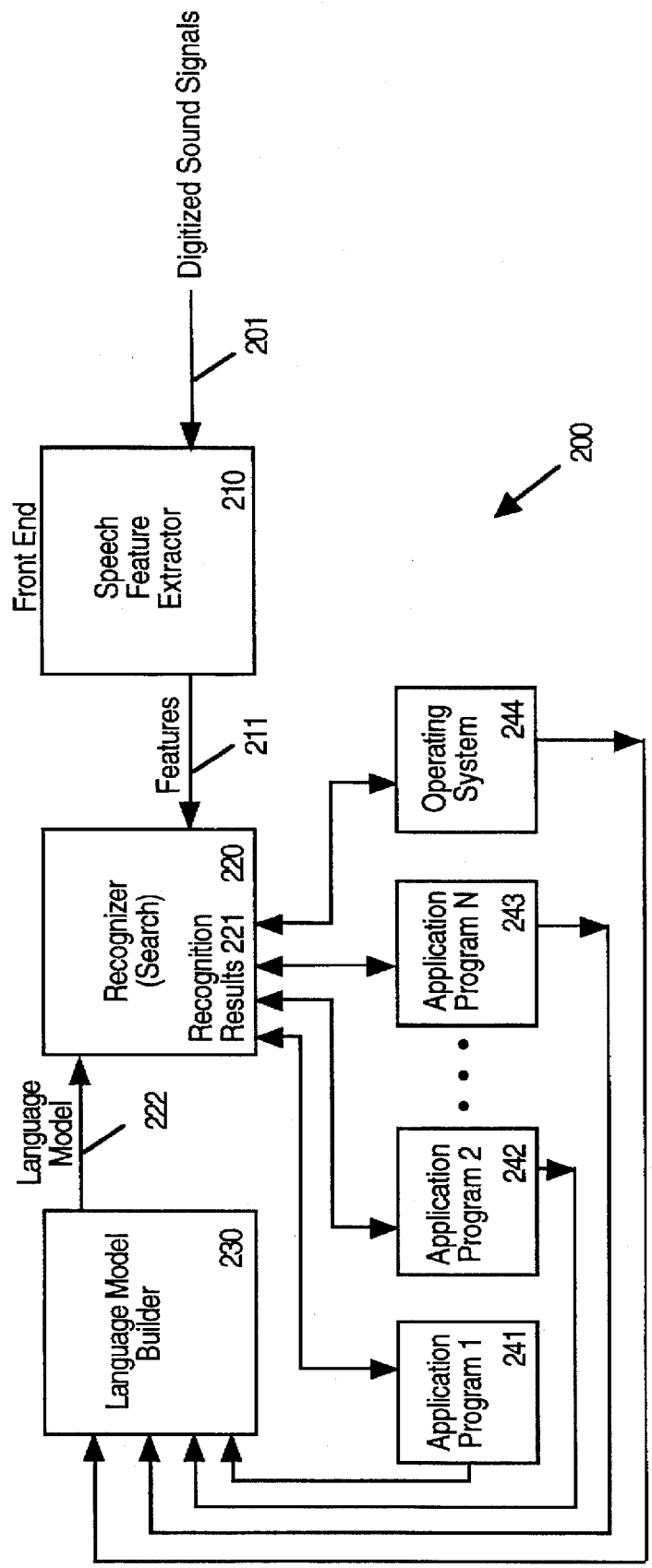
FIG. 2 shows a block diagram of the functional components of a speech recognition system upon which the present invention can be implemented.

FIG. 2 shows a block diagram of the functional components of a speech recognition system upon which the present invention can be implemented. As an example, this system is designed to perform real-time, continuous-speech, speaker-independent speech recognition on a personal-computer class of computer system.

The speech recognition system 200 receives digitized sound signals 201, such as processed signals from a sound sampling device 125 of FIG. 1. The digitized sound signals 201 are processed by a speech feature extractor 210, also known as a "front end", to generate speech features 211. The speech features 211 are an encoded representation of information corresponding to phonemes and other speech units which have been separated from the noises and non-speech elements of the digitized sound signals 201. These functions can sometimes be optimally performed by processing steps on a specialized processing device such as the digital signal processor 108 of FIG. 1.

The speech features 211 are input to a speech recognizer 220. The speech recognizer 220 also receives a language model 222 from a language model builder 230. The recognizer 220 functions primarily as a search engine which looks for matches of elements of the speech features 211 to the elements of the language model 222. When matches are found, the recognizer 220 generates recognition results 221. The recognition results 221 are returned to the current application program 241, other application programs 242, 243, or the operating system 244. For purposes of this description, the operating system 244 can be treated as another application program using the speech recognition system.

The language model 222 is generated by the language model builder 230 with input from the application programs. More than one language model can be generated but the recognizer 220 will use only one current or active language model 222 at a time. The creation, structure and use of the language model 222 will be described in more detail later in this patent specification.

The functions of the recognizer 220, language model builder 230, application programs 241, 242, 243 and operating system 244 can be implemented as data processing steps on the processor 102 of computer 100 of FIG. 1. Data elements such as the features 211, language model 222 and recognition results 221 can be stored in main memory 104 or mass storage device 107 and passed along bus 101 to the processor 102.

In operation, the computer user speaks a phrase, which is received by sound sampling device 125, digitized, and passed as a digital sound signal 201 to the digital signal processor 108 or processor 102. The speech feature extractor 210 extracts speech features 211 and passes them to the recognizer 220. Meanwhile, the language model builder 230 has received information from the application programs to use in generating a language model 222, which is passed to the recognizer 220. The recognizer 220 compares the speech features 211 to the language model 222 and detects matches. The recognizer 220 generates recognition results 221 which are passed to one or more of the application programs. An application program interprets the recognition results 221 and determines and performs an appropriate next action or response. These functions of speech recognition can operate continuously, or in time segments between which the various elements of the recognition system such as the language model can be updated, and feedback provided to the computer user.

In accordance with this invention, the language model is generated with an embedded structure and attached data values. Also, the recognition results are returned as a reconstructed language model with an embedded structure and attached data values. An application program can receive and traverse the recognition results structure, and use the attached data values to improve the speed and accuracy of interpretation of the speech recognition results.

A method of speech recognition can include the application program receiving the recognition result and traversing the embedded structure and attached data values of the recognition result.

The Language Model with Embedded Structure

In the prior art, a language model might be a simple list of words and phrases to be recognized. In accordance with this invention, the language model 222 has an embedded structure and attached data values. The language model is structured to represent the alternative speech paths and words along each path. The structure contains elements of the language model arranged according to phrases, syntax, parts of language, language sub-models and other structural forms.

For example, suppose an application program wished to recognize sentences like:

"call Matt",
"call Kim",
"call Arlo",
"open status report", or
"open April budget".

Using traditional methods, the language model would be a simple list of each of the unique words as in Language Model 1:

Language Model 1:

call
Matt
Kim
Arlo
open
status
report
April
budget

In the prior art, if the speech recognizer recognized the phrase "call Arlo", it would return that result to the application program in the form of a text string "call Arlo" or a string of symbols that map to the recognized words e.g. "01, 04." The application program then must interpret this result by identifying the words or symbols in the string and reconstructing the meaning in a process called parsing or interpretation, before it can determine how this phrase directed to this application program can cause an appropriate action or response.

In a method in accordance with this invention, the application program and language model generator create a language model with structure, as in Language Model 2, which is a structured form of previous Language Model 1:

Language Model 2:

<Model>=<call phrase>|<open phrase>;
<call phrase>=call <name>;
<open phrase>=open <file>;
<name>=Matt|Kim|Arlo;
<file>=status report|April budget;

The conventions used here are that, a phrase in brackets, such as "<Model>" identifies a language model element which can be built of other phrases or language model elements. The equal sign "=" indicates that the alternatives to build a language model element will follow in a list which includes alternatives separated by the vertical bar "|". Therefore, in Language Model 2, the <Model> element can consist of an element <call phrase> or an element <open phrase>. A <call phrase> consists of the word "call" followed by a <name> element. A <name> element can consist of the words "Matt" or "Kim" or "Arlo". In a preferred implementation, object-oriented programming principles are used to implement language model elements in order to allow inheritance of characteristics and other advantages. Other language model structures and notations are possible, but this example will suffice to describe the present invention.

The Language Model with Attached Data Values

In accordance with this invention, the language model has an embedded structure and attached data values. The attached data values are annotations or indicators having assigned values which are attached to various elements of the language model, including the structural elements. The data values can be assigned in order to indicate parts of speech, names, commands, external references, or as indications of the path or hierarchy followed to reach a current element of the structure of the language model. Continuing to build upon the previous example, an application can assign attached data to parts of the structure and elements of the language model, as in Language Model 3, which is Language Model 2 with attached data:

Language Model 3:

<Model>(D1)=<call phrase>|<open phrase>;

\<call phrase\>(D2)=call \<name\>;
\<open phrase\>(D3)=open \<file\>;
\<name\>(D4)=Matt(D6)|Kim(D7)|Arlo(D8);
\<file\>(D5)=status report(D9)|April budget(D10);

D1, D2, etc., are the data values attached to parts of the language model. They can be simple numbers used to identify the elements in the language model, or they can be references to larger application-specific data structures. Note that D2 will refer to a structural element, i.e. the "\<call phrase\>" sub-language model, while D7 will refer to a specific terminal element, the name "Kim".

The Recognition Results

In accordance with this invention, when a language model 222 having embedded structure and attached data values is used for speech recognition, the recognizer 220 returns recognition results 221 which are also in a form having an embedded structure with attached data values.

The recognizer 220 returns recognition results 221 as a reconstructed language model with attached data values. The structure of the recognition results 221 will parallel the structure of the original language model 222, but will only include the traversed or terminal recognized elements. The recognition results 221 will contain only the structure and data values relevant to the recognized speech. The attached data values of the recognition results 221 will be the data values that were attached to the same elements in the original language model 222. In this way, a "pruned" or "trimmed" version of the original language model 222 is provided as the recognition results 221. The recognition results 221 can be generated by reconstruction from scratch, or by reconstruction by a "pruning" of the original language model.

Thus, when the user says a phrase like "call Kim", a speech recognition system using this invention returns not only the text string "call Kim", but also a parseable structure paralleling the original language model structure but reconstructed to include only those paths relevant to the recognized speech, and with attached data values that were attached to the same elements of the original language model. Continuing to build upon the previous examples, Recognition Results 1 shows the structure and data of recognition results returned from a recognizer using Language Model 3 and receiving the speech "call Kim":

Recognition Results 1:

\<Model\>(D1)=\<call phrase\>;
\<call phrase\>(D2)=call \<name\>;
\<name\>(D4)=Kim(D7);

Note that in Recognition Results 1, that only the relevant structure and data values are returned. Other structure and data values are not returned, for example, no portion of the "open status report" elements.

Use of the Recognition Results

The advantage of providing recognition results with an embedded structure and attached data values is that the structure and data values can assist the application program in interpreting the recognition results.

In the prior art, a recognizer might only return a simple string of text or symbols without structure or attached values. When the results are returned as a simple list of words, the application program must parse or interpret the words before it can apply the words to the current program state. Only then, can it determine a next action or response.

This parsing or interpretation can be slow and error-prone where the possible words are widely varied, or the command language is somewhat free-form and unstructured.

In the method of this invention, the recognition results contain structure and data values which can eliminate or accelerate much of the parsing or interpretation. Also, the structure and data values can improve the accuracy of interpretation, by eliminating invalid sequences and resolving ambiguous references. Recognition results with structure and attached data values can provide both semantic and syntactic information. They provide semantic information where they show the intended meaning of spoken words, e.g. being marked by a specific pre-assigned data value. They provide syntactic information where they show the positional or referential meaning by indicating such things as the parts of speech, what type of language sub-model, the elements and options of a phrase, whether an element fits in the position of a noun or verb in the phrase, etc.

For example, if the recognized words are known from the structure or attached data values to be a verb and a noun, the application program can immediately proceed to compare the verb to its available commands, and the noun to available target objects such as filenames.

Referring again to Recognition Results 1 which were returned in response to the speech "call Kim", the application program can traverse this recognition result structure from the top down and immediately identify the spoken phrase, based on its D2 label, as belonging to the \<call phrase\> sub-Language Model. Traversing further, the application can immediately identify the specific name spoken as the one corresponding to datum D7, which is "Kim". An application might actually use a programming method with a "pointer" for each of the data values, so that when the data value is returned, it can immediately be used as an addressing mechanism to reference data stored in specific places within the application. For example, D7 could be a pointer referring directly to an address record containing Kim's phone number. The application can then execute the appropriate response, such as dialing Kim's phone number. Without this invention, an application would have to do much more work to identify what sort of words were spoken, to identify the specific meaning of the words, and to take an appropriate action.

Other embodiments and variations of the invention will be apparent to a person skilled in the art from a consideration of this specification, and it is intended that the scope of the invention be limited only by the allowable legal scope of the following claims.

We claim:

1. A method of speech recognition for a speech recognition system operating on a computer system, comprising the steps of:

the speech recognition system generating a language model with embedded structure and attached data values;

the speech recognition system receiving a sound signal;

the speech recognition system processing the sound signal to extract speech features;

the speech recognition system comparing and matching the speech features to the language model for generating a recognition result having the embedded structure and attached data values of the language model for those portions of the language model matched to the speech features.

2. A method of speech recognition as in claim 1, further comprising the steps of an application program receiving the recognition result and traversing the embedded structure and attached data values of the recognition result.

3. A method of speech recognition for a speech recognition system operating on a computer system which receives a sound signal and produces a recognition result, comprising the steps of:

the speech recognition system generating a language model having an embedded structure in which language model elements are held, and having data values attached to the elements of the language model;

the speech recognition system receiving the sound signal;

the speech recognition system processing the sound signal to extract speech features;

the speech recognition system comparing the speech features to the language model to identify portions of the language model matched by the speech features; and the speech recognition system generating the recognition result, by including within the recognition result the embedded structure and attached data values of the language model for the portions of the language model matched by the speech features.

4. A method of speech recognition as in claim 3, further comprising the steps of an application program receiving the recognition result and traversing the embedded structure and attached data values of the recognition result.

5. A method of speech recognition for a speech recognition system operating on a computer system, comprising the steps of:

an application program generating and embedding a structure and attached data values to elements of a language model;

a speech recognizer receiving and storing the language model;

the speech recognition system receiving a sound signal;

the speech recognition system processing the sound signal to extract speech features; the speech recognizer receiving the speech features and comparing the speech features to the language model to identify portions of the language model which match the speech features;

the speech recognizer generating a recognition result by placing the embedded structure and attached data values of the portions of the language model which match the speech features into the recognition result; and returning the recognition result from the speech recognizer to the application program.

6. A method of speech recognition as in claim 5, further comprising the steps of the application program receiving the recognition result and traversing the embedded structure and attached data values of the recognition result to determine a next action of the application program.

7. A speech recognition system operating on a computer system, comprising:

a speech feature extractor adapted for receiving a digitized sound signal and extracting speech features;

a language model with embedded structure and attached data values;

a speech recognizer for comparing the speech features to the language model to identify a matched portion of the language model, the speech recognizer further adapted to generate a recognition result comprising the embedded structure and attached data values of the matched portion of the language model; and an application program for receiving the recognition result.

8. A speech recognition system operating on a computer system for receiving a sound signal and producing a recognition result, comprising:

a speech feature extractor adapted for receiving the sound signal and generating speech features;

a language model builder for generating a language model having language model elements and attached data values;

a speech recognizer for comparing the speech features to the language model to identify matched language model elements and attached data values;

the speech recognizer generating the recognition result of the matched language model elements and attached data values.

9. A speech recognition system as in claim 8, further comprising an application program for receiving the recognition result.

* * * * *